(12) United States Patent
Van De Haar et al.

(10) Patent No.: US 11,428,830 B2
(45) Date of Patent: Aug. 30, 2022

(54) DETECTOR FOR X-RAY IMAGING (71) Applicant: KONINKLIJKE PHILIPS N.V., Eindhoven (NL)

(72) Inventors: Peter George Van De Haar, Eindhoven (NL); Walter Ruetten, Linnich (DE); Heidrun Steinhauser, Eindhoven (NL); Herman Stegehuis, Best (NL); Onno Jan Wimmers, Valkenswaard (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 104 days.

(21) Appl. No.: 16/959,542

(22) PCT Filed: Dec. 31, 2018

(86) PCT No.: PCT/EP2018/086898
§ 371 (c)(1),
(2) Date: Jul. 1, 2020

(87) PCT Pub. No.: WO2019/134882
PCT Pub. Date: Jul. 11, 2019

(65) Prior Publication Data
US 2021/0072412 A1 Mar. 11, 2021

(30) Foreign Application Priority Data
Jan. 2, 2018 (EP) .................................... 18150035

(51) Int. Cl.
*G01T 1/20* (2006.01)
*G01T 1/29* (2006.01)
*G01T 1/202* (2006.01)

(52) U.S. Cl.
CPC .......... *G01T 1/2992* (2013.01); *G01T 1/2018* (2013.01); *G01T 1/2023* (2013.01)

(58) Field of Classification Search
CPC ... G01T 1/1611; G01T 1/2018; G01T 1/2023; G01T 1/2992
See application file for complete search history.

(56) References Cited

U.S. PATENT DOCUMENTS

2008/0011960 A1 1/2008 Yorkston
2008/0315106 A1 12/2008 Buchinsky
(Continued)

FOREIGN PATENT DOCUMENTS

DE 102011089595 A1 6/2013
WO WO2012066469 A1 5/2012
WO WO2017067846 A1 4/2017

OTHER PUBLICATIONS

PCT International Search Report, International Application No. PCT/EP2018/086898, dated Mar. 21, 2019.

*Primary Examiner* — Mark R Gaworecki
(74) *Attorney, Agent, or Firm* — Larry Liberchuk (57) ABSTRACT

An X-ray detector is positioned relative to an X-ray source such that at least a part of a region between the X-ray source and the X-ray detector is an examination region for accommodating an object. The X-ray source and X-ray detector are controlled by a processing unit in order to operate in a first imaging operation mode, a second imaging operation mode, and/or a third imaging operation mode. The detector comprises a first scintillator, a second scintillator, a first sensor array, and a second sensor array. The first scintillator is disposed over the second scintillator such that X-rays emitted from the X-ray source first encounter the first scintillator and then encounter the second scintillator.

12 Claims, 5 Drawing Sheets

(56) References Cited

U.S. PATENT DOCUMENTS

2011/0303849 A1    12/2011  Tredwell
2017/0238887 A1*    8/2017  Karim ................... A61B 6/482
2019/0083053 A1*    3/2019  Lounsberry .......... A61B 6/4241

* cited by examiner

DETECTOR FOR X-RAY IMAGING

FIELD OF THE INVENTION

The present invention relates to a detector for X-ray imaging, to a system for X-ray imaging, and to a method for X-ray imaging.

BACKGROUND OF THE INVENTION

Different X-ray imaging modalities require the utilization of different X-ray detector technologies. For example, X-ray detectors used for 2D high resolution imaging can employ a scintillator that absorbs X-ray photons to produce light photons that are detected by a sensor array. To provide for high spatial resolution, the scintillator is relatively thin in order that lateral light diffusion is not too great. This means that only relatively low energy X-ray photons are absorbed in the scintillator. Conversely, X-ray detectors used for 3D imaging purposes requiring high contrast seek to absorb more X-ray photons than such 2D detectors, and the scintillator is made thicker at the expense of spatial resolution. Furthermore, imaging modalities such as dual energy acquisition require dual source, fast kVp switching or dual-layer detector configurations.

EP2640270A1 describes a radiation detector having a first detector layer and a second detector layer encircles an examination region. Detectors of the first layer include scintillators and light detectors, such as avalanche photodiodes. The detectors of the second detector layer include scintillators and optical detectors. The scintillators of the first layer have a smaller cross-section than the scintillators of the second layers. A group, e.g., nine, of the first layer scintillators overlay each second group scintillator. In a CT mode, detectors of the first layer detect transmission radiation to generate a CT image with a relatively high resolution and the detectors of the second layer detect PET or SPECT radiation to generate nuclear data for reconstruction into a lower resolution emission image. Because the detectors of the first and second layers are aligned, the transmission and emission images are inherently aligned.

WO2008/067846A1 describes a radiation detector for combined detection of low-energy radiation quanta and high-energy radiation quanta, the radiation detector having a multi-layered structure, comprising: a rear scintillator layer configured to emit a burst of scintillation photons responsive to a high-energy radiation quantum being absorbed by the rear scintillator layer; a rear photo sensor layer attached to a back side of the rear scintillator layer, said rear photo sensor layer configured to detect scintillation photons generated in the rear scintillator layer; a front scintillator layer arranged in front of the rear scintillator layer opposite the rear photo sensor layer, said front scintillator layer configured to emit a burst of scintillation photons responsive to a low-energy radiation quantum being absorbed by the front scintillator layer; and a front photosensor layer attached to a front side of the front scintillator layer opposite the rear scintillator layer, said front photo sensor layer configured to detect scintillation photons generated in the front scintillator layer, wherein the high-energy radiation quantum is a gamma ray and the low-energy radiation quantum is an X-ray.

US2008/315106A1 describes that a radiation detector includes at least first and second scintillators which absorb radiation and generate light at respective first and second wavelengths. The detector also includes at least first and second photodetectors. The first photodetector is substantially non-responsive to light of the wavelength generated by the second scintillator. Detectors having three or more scintillators and photodetectors may also be implemented.

There is a need to provide an improved detector for X-ray imaging.

SUMMARY OF THE INVENTION

It would be advantageous to have an improved detector for X-ray imaging, system for X-ray imaging and method for X-ray imaging.

The object of the present invention is solved with the subject matter of the independent claims, wherein further embodiments are incorporated in the dependent claims. It should be noted that the following described aspects and examples of the invention apply also to the detector for X-ray imaging, the system for X-ray imaging, and the method for x-ray imaging. According to a first aspect, there is provided a detector for X-ray imaging comprising:
  a first scintillator;
  a second scintillator;
  a first sensor array; and
  a second sensor array.

The first sensor array is associated with the first scintillator. The first sensor array comprises an array of sensor elements configured to detect optical photons generated in the first scintillator. The second sensor array is associated with the second scintillator. The second sensor array comprises an array of sensor elements configured to detect optical photons generated in the second scintillator. The first scintillator is disposed over the second scintillator such that X-rays emitted from an X-ray source first encounter the first scintillator and then encounter the second scintillator. The first scintillator has a thickness equal to or greater than 0.6 mm. The second scintillator has a thickness equal to or greater than 1.1 mm. In a first imaging operation mode the first scintillator and the first sensor array are configured to provide data useable to generate a low energy X-ray image. In a second imaging operation mode the second scintillator and the second sensor array are configured to provide data useable to generate a high energy X-ray image. In a third imaging operation mode the first scintillator, the first sensor array, the second scintillator and the second sensor array are configured to provide data useable to generate a combined energy X-ray image.

In this manner, a first scintillator being thin provides for high resolution 2D imaging in a first mode of operation. Additionally, dual energy imaging is provided through having a thicker scintillator placed below the thinner scintillator that detects higher energy X-rays, through operation in the first mode and in a second mode with the data treated separately. Furthermore, very high contrast imaging is provided, suitable for example in 3D imaging systems in a C-arm system, through combining data from both scintillators in a third mode, which in effect also provides for increased detected quantum efficiency DQE(0). Furthermore, also higher kVp can be used (for example 140 kVp instead of 120 kVp): The increased scintillator thickness of the third mode ensures that the extra high energetic X-ray quanta are absorbed compared to the first mode. Advantage of 140 kVp is that 1) the higher energetic X-ray have sufficient energy to be transmitted by obese patients and 2) it increases spectral performance.

Another example of exploiting the detector is: if the bottom layer has larger contrast (but lower spatial resolution) and the top layer a higher spatial resolution (but lower contrast), a 'super-resolution' algorithm can then be applied to interpolate to higher resolution, based on the information from the first layer.

In the first aspect, the thickness of the first scintillator is less than 1 mm.

In an example, the first scintillator is a CsI scintillator.

In an example, the first scintillator comprises a needle structure.

Thus, the first scintillator provides for even higher resolution capabilities through utilizing needle structures to provide wave-guiding down to an optical image sensor that forms part of the scintillator.

A thermal evaporation process, for example, can be used to deposit a scintillator material having a needle structure. Thus, any scintillator material that is deposited by thermal evaporation can be given a needle structure (by using as small an angle of incidence as possible onto the substrate).

In an example, the second scintillator is a CsI scintillator.

In an example, the second scintillator comprises a needle structure.

Furthermore, by providing a needle like structure for the second scintillator higher resolution is provided at the same time as providing for high X-ray absorption.

Thus, the wave-guiding functionality of a scintillator having a needle structure means that even without binning, a thicker material layer (compared with the situation that a scintillator without needle structure is used) can be used without compromising resolution.

In an example, the second scintillator is a Gadolinium Oxysulfide scintillator. In an example, the second scintillator is a (CT-like) pixelated Gadolinium Oxysulfide scintillator. The second scintillator can be formed from other materials that are similar to GOS. In an example a scintillator can be made from $Gd_2O_2S:Tb$, $Gd_2Q_2S:Eu$, $Gd_2O_3:Eu$, $La_2O_2S:Tb$, $La_2O_2S$, $Y_2O_2S:Tb$, $CsI:Tl$, $CsI:Na$, $CsBr:Tl$, $NaI:Tl$, $CaWO_4$, $CaWO_4:Tb$, $BaFBr:Eu$, $BaFCl:Eu$, $BaSO_4:Eu$, $BaSrSO_4$, $BaPbSO_4$, $BaAl_{12}O_{19}:Mn$, $BaMgAl_{10}O_{17}:Eu$, $Zn_2SiO_4:Mn$, $(Zn,Cd)S:Ag$, $LaOBr$, $LaOBr:Tm$, $Lu_2O_2S:Eu$, $Lu_2O_2S:Tb$, $LuTaO_4$, $HfO_2:Ti$, $HfGeO_4:Ti$, $YTaO_4$, $YTaO_4:Gd$, $YTaO_4:Nb$, $Y_2O_3:Eu$, $YBO_3:Eu$, $YBO_3:Tb$, or $(Y,Gd)BO_3:Eu$ or combinations thereof.

In an example, operation in the first imaging mode comprises a binning process to combine signals from a plurality of adjacent sensor elements of the first sensor array.

In other words, binning can be used to increase signal to noise and to increase read-out speeds, with a reduced resolution. This also enables imagery in the low energy X-ray region to have the same resolution in the high energy X-ray region.

Binning also enables a scintillator that is a CsI (or other material) scintillator to have a thickness greater than 0.8 mm and operate in a faster mode. Thus, for a CsI scintillator that has a thickness greater than 0.8 mm there is an increasing loss in resolution with increasing thickness because the visible photons generated in the scintillator diffuse to an increasing number of neighbouring pixels. Therefore, binning of neighboring pixels when the scintillator has a greater thickness than 0.8 mm does not necessarily lead to a loss of resolution, but does increase speed of operation. The sensor array associated with the scintillator can have larger pixel sizes to match the increasing thickness of a scintillator, however by binning a standard sensor array that has fixed pixel sizes can be used for all scintillator thicknesses, with a binning process being used that is consistent with the intrinsic resolution of that scintillator thickness. Therefore, a scintillator thickness can be such that the signal extends over more than one pixel of a standard sensor array, that could be for example optimized for a thinner scintillator. Then, binning can be used to increase the speed of operation without actually leading to a reduction in resolution for such a standard sensor array. Binning can however also be used to further reduce the resolution below that relating to the intrinsic thickness of the scintillator, to further increase speed, increase signal to noise and further to provide image data with a resolution that matches that from the thicker second scintillator, where such matching can aid in dual energy analyses and aid in combining the output from the first and second sensor arrays in providing the combined image.

In the first aspect, operation in the second imaging mode comprises a binning process to combine signals from a plurality of adjacent sensor elements of the second sensor array.

In this way, the speed of operation of the second imaging mode can be increased. Also, as discussed above with respect to the first scintillator the binning process can enable a standard sensor array to be used, where visible photons generated from an x-ray associated with one pixel diffuse to neighboring pixels due to the thickness of the scintillator, to increase speed without actually there being a reduction in the intrinsic resolution of the returned image data but with speed improvements being effected.

In an example, operation in the third imaging mode comprises a first binning process to combine signals from a plurality of adjacent sensor elements of the first sensor array and comprises a second binning process to combine signals from a plurality of adjacent sensor elements of the second sensor array.

In an example, a pixel size of the sensor elements of the first sensor array is the same as a pixel size of the sensor elements of the second sensor array.

In an example, a pixel size of the sensor elements of the first sensor array is smaller than a pixel size of the sensor elements of the second sensor array.

Thus, binning for example can be used with respect to the first scintillator to provide for an effective pixel size that is the same as that for the second scintillator which can operate without a binning process, but where data from both scintillators can be efficiently combined to provide a high contrast image suitable for 3D imaging, such as in Cone Beam Computer Tomography CBCT systems.

According to a second aspect, there is provided a detector for X-ray imaging utilizing a GOS scintillator, the detector comprising:

a first scintillator;

a second scintillator;

a first sensor array; and a second sensor array.

The first sensor array is associated with the first scintillator. The first sensor array comprises an array of sensor elements configured to detect optical photons generated in the first scintillator. The second sensor array is associated with the second scintillator. The second sensor array comprises an array of sensor elements configured to detect optical photons generated in the second scintillator. The first scintillator is disposed over the second scintillator such that X-rays emitted from an X-ray source first encounter the first scintillator and then encounter the second scintillator. The first scintillator has a thickness equal to or greater than 0.6 mm. The second scintillator has a thickness equal to or greater than 0.6 mm. The second scintillator is a Gadolinium Oxysulfide scintillator. In a first imaging operation mode the first scintillator and the first sensor array are configured to provide data useable to generate a low energy X-ray image.

In a second imaging operation mode the second scintillator and the second sensor array are configured to provide data useable to generate a high energy X-ray image. In a third imaging operation mode the first scintillator, the first sensor array, the second scintillator and the second sensor array are configured to provide data useable to generate a combined energy X-ray image.

In the second aspect, the thickness of the first scintillator is less than 1 mm.

In the second aspect, operation in the second imaging mode comprises a binning process to combine signals from a plurality of adjacent sensor elements of the second sensor array.

In this manner, usage of a GOS scintillator can lead to reduced afterglow and reduced ghosting, which is the case if GOS is doped with Pr (instead of Tb). Afterglow (or lag) is a term used with respect to additive temporal effects, ghosting (or bright-burn) is a term used with respect to multiplicative temporal effects. Both effects exist in a scintillator and can give artifacts in an X-ray detector image, however use of the GOS scintillator can mitigate such effects (or at least reduce such effects towards CT-like imaging).

If a scintillator is to be used that does not have a needle structure, then there are advantages to be gained by a GOS scintillator, for example GdOS:Tb.

According to a third aspect, there is provided an X-ray imaging system comprising:
an X-ray source;
an X-ray detector according to the first aspect or the second aspect; and
a processing unit.

The X-ray detector is positioned relative to the X-ray source such that at least a part of a region between the X-ray source and the X-ray detector is an examination region for accommodating an object. The processing unit is configured to control the X-ray source and the X-ray detector to: operate in the first imaging operation mode; operate in the second imaging operation mode; and operate in the third imaging operation mode.

According to a fourth aspect, there is provided a method for X-ray imaging comprising:
a) positioning an X-ray detector relative to an X-ray source such that at least a part of a region between the X-ray source and the X-ray detector is an examination region for accommodating an object;
b) controlling the X-ray source and the X-ray detector by a processing unit and:
c) operate in a first imaging operation mode; or
d) operate in a second imaging operation mode; or
e) operate in the first imaging mode and in the second imaging mode; or
f) operate in a third imaging operation mode;
wherein, the detector comprises a first scintillator, a second scintillator, a first sensor array, and a second sensor array. The first sensor array is associated with the first scintillator. The first sensor array comprises an array of sensor elements configured to detect optical photons generated in the first scintillator. The second sensor array is associated with the second scintillator. The second sensor array comprises an array of sensor elements configured to detect optical photons generated in the second scintillator. The first scintillator is disposed over the second scintillator such that X-rays emitted from the X-ray source first encounter the first scintillator and then encounter the second scintillator. The first scintillator has a thickness equal to or greater than 0.6 mm. The second scintillator has a thickness equal to or greater than 1.1 mm. In the first imaging operation mode the first scintillator and the first sensor array are configured to provide data useable to generate a low energy X-ray image. In the second imaging operation mode the second scintillator and the second sensor array are configured to provide data useable to generate a high energy X-ray image. In the third imaging operation mode the first scintillator, the first sensor array, the second scintillator and the second sensor array are configured to provide data useable to generate a combined energy X-ray image.

In the fourth aspect, the thickness of the first scintillator is less than 1 mm.

In the fourth aspect, operation in the second imaging mode comprises a binning process to combine signals from a plurality of adjacent sensor elements of the second sensor array.

According to another aspect, there is provided a computer program element controlling apparatus as previously described which, when the computer program element is executed by a processing unit, is adapted to perform the method steps as previously described.

According to another aspect, there is provided a computer readable medium having stored computer element as previously described.

Advantageously, the benefits provided by any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF EMBODIMENTS

Figure 1:
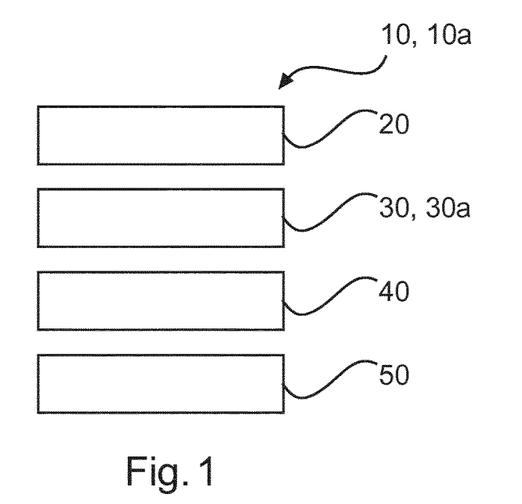
FIG. 1 shows a schematic set up of an example of a detector for X-ray imaging.

FIG. 1 shows an example of a detector 10 for X-ray imaging. The detector 10 comprises a first scintillator 20, a second scintillator 30, a first sensor array 40, and a second sensor array 50. The first sensor array 40 is associated with the first scintillator 20. The first sensor array 40 comprises an array of sensor elements configured to detect optical photons generated in the first scintillator 20. The second sensor array 50 is associated with the second scintillator 30. The second sensor array 50 comprises an array of sensor elements configured to detect optical photons generated in the second scintillator 30. The first scintillator 20 is disposed over the second scintillator 30 such that X-rays emitted from an X-ray source first encounter the first scintillator 20 and then encounter the second scintillator 30. The first scintillator 20 has a thickness equal to or greater than 0.6 mm. The second scintillator 30 has a thickness equal to or greater than 1.1 mm. In a first imaging operation mode the first scintillator 20 and the first sensor array 40 are configured to provide data useable to generate a low energy X-ray image. In a second imaging operation mode the second scintillator 30 and the second sensor array 50 are configured to provide data useable to generate a high energy X-ray image. In a third imaging operation mode the first scintillator 20, the first sensor array 40, the second scintillator 30 and the second sensor array 50 are configured to provide data useable to generate a combined energy X-ray image.

According to an example, the thickness of the first scintillator is less than 1 mm.

In an example, the thickness of the first scintillator is less than or equal to 0.8 mm. In this way, when without binning this maximum thickness avoids a too-large reduction in MTF (spatial resolution or sharpness) for a CsI scintillator.

In an example, the thickness of the second scintillator is less than 1.8 mm.

In an example, the thickness of the second scintillator is greater than or equal to 1.2 mm. In an example, the thickness of the second scintillator is greater than or equal to 1.3 mm. In an example, the thickness of the second scintillator is greater than or equal to 1.4 mm. In an example, the thickness of the second scintillator is greater than or equal to 1.5 mm. In an example, the thickness of the second scintillator is greater than or equal to 1.6 mm. In an example, the thickness of the second scintillator is greater than or equal to 1.7 mm. In this way, when without binning this maximum thickness avoids a too-large reduction in MTF (sharpness) for a CsI scintillator, when high resolution data are required to be returned from the second scintillator.

According to an example, the first scintillator is a CsI scintillator.

According to an example, the first scintillator comprises a needle structure.

According to an example, the second scintillator is a CsI scintillator.

In an example, CsI has in addition to Tl, also other co-dopings, for example to reduce temporal effects.

According to an example, wherein the second scintillator comprises a needle structure.

According to an example, the second scintillator is a Gadolinium Oxysulfide scintillator.

According to an example, operation in the first imaging mode comprises a binning process to combine signals from a plurality of adjacent sensor elements of the first sensor array.

According to an example, operation in the second imaging mode comprises a binning process to combine signals from a plurality of adjacent sensor elements of the second sensor array.

According to an example, operation in the third imaging mode comprises a first binning process to combine signals from a plurality of adjacent sensor elements of the first sensor array and comprises a second binning process to combine signals from a plurality of adjacent sensor elements of the second sensor array.

In an example, the first binning process is the same as the second binning process.

Thus, the binning process itself can be used as part of the process of combining the low and high energy data to generate the combined image.

In an example, a spatial extent of the adjacent sensor elements of the first sensor array whose signals are being combined is the same as a spatial extent of the adjacent sensor elements of the second sensor array whose signals are being combined.

According to an example, a pixel size of the sensor elements of the first sensor array is the same as a pixel size of the sensor elements of the second sensor array.

According to an example, a pixel size of the sensor elements of the first sensor array is smaller than a pixel size of the sensor elements of the second sensor array.

In an example, the pixel size of the sensor elements of the first scintillator is 150 µm.

FIG. 1 can also represent a different detector 10a for X-ray imaging. This detector 10a utilizes a GOS scintillator and comprises a first scintillator 20, a second scintillator 30a, a first sensor array 40, and a second sensor array 50. The first sensor array 40 is associated with the first scintillator 20. The first sensor array 40 comprises an array of sensor elements configured to detect optical photons generated in the first scintillator 20. The second sensor array 50 is associated with the second scintillator 30a. The second sensor array 50 comprises an array of sensor elements configured to detect optical photons generated in the second scintillator 30a. The first scintillator 20 is disposed over the second scintillator 30a such that X-rays emitted from an X-ray source first encounter the first scintillator 20 and then encounter the second scintillator 30a. The first scintillator 20 has a thickness equal to or greater than 0.6 mm. The second scintillator 30a has a thickness equal to or greater than 0.6 mm. The second scintillator 30a is a Gadolinium Oxysulfide scintillator. In a first imaging operation mode the first scintillator 20 and the first sensor array 40 are configured to provide data useable to generate a low energy X-ray image. In a second imaging operation mode the second scintillator 30a and the second sensor array 50 are configured to provide data useable to generate a high energy X-ray image. In a third imaging operation mode the first scintillator 20, the first sensor array 40, the second scintillator 30a and the second sensor array 50 are configured to provide data useable to generate a combined energy X-ray image.

In an example, the second scintillator has a thickness equal to or greater than 0.8 mm. In an example, the second scintillator has a thickness equal to or greater than 1.0 mm. In an example, the second scintillator has a thickness equal to or greater than 1.2 mm. In an example, the second scintillator has a thickness equal to or greater than 1.3 mm.

In an example, the thickness of the first scintillator is less than 1 mm. In an example, the first scintillator is a CsI scintillator. In an example, the first scintillator comprises a needle structure.

In an example, operation in the first imaging mode comprises a binning process to combine signals from a plurality of adjacent sensor elements of the first sensor array.

In an example, operation in the second imaging mode comprises a binning process to combine signals from a plurality of adjacent sensor elements of the second sensor array.

In an example, operation in the third imaging mode comprises a first binning process to combine signals from a plurality of adjacent sensor elements of the first sensor array and comprises a second binning process to combine signals from a plurality of adjacent sensor elements of the second sensor array.

In an example, a pixel size of the sensor elements of the first sensor array is the same as a pixel size of the sensor elements of the second sensor array.

In an example, a pixel size of the sensor elements of the first sensor array is smaller than a pixel size of the sensor elements of the second sensor array.

Figure 2:
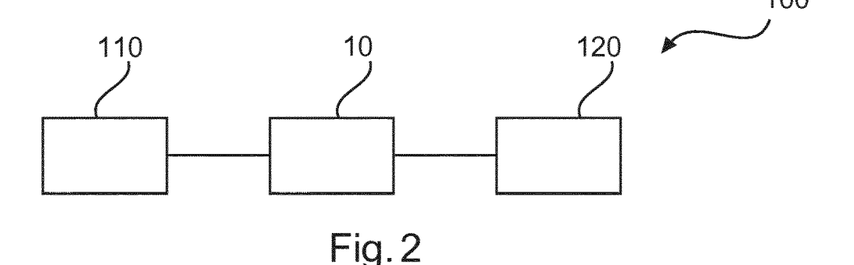
FIG. 2 shows a schematic set up of an example of a system for X-ray imaging.

FIG. 2 shows an example of an X-ray imaging system 100. The system 100 comprises an X-ray source 110, an X-ray detector 10 or an X-ray detector 10a as described with respect to FIG. 1. The system 100 also comprises a processing unit 120. The X-ray detector 10, 10a is positioned relative to the X-ray source 110 such that at least a part of a region between the X-ray source 110 and the X-ray detector 10, 10a is an examination region for accommodating an object. The processing unit 120 is configured to control the X-ray source 110 and the X-ray detector 10, 10a to: operate in the first imaging operation mode; operate in the second imaging operation mode; and operate in the third imaging operation mode.

Figure 3:
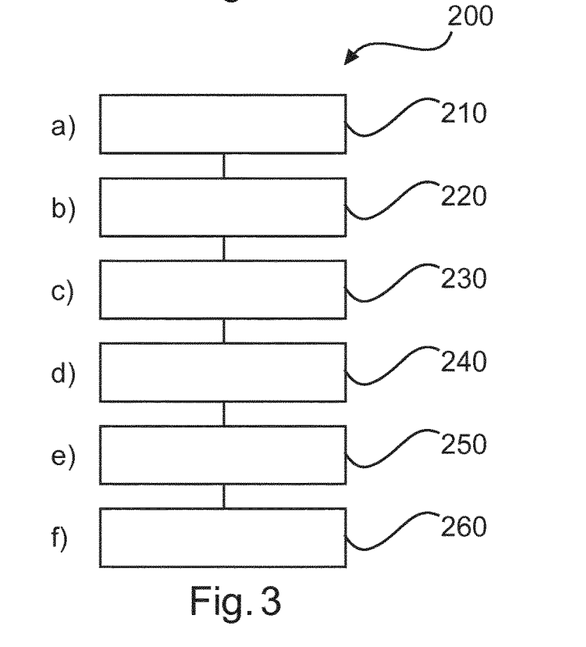
FIG. 3 shows an example of a method for X-ray imaging.

FIG. 3 shows a method 200 for X-ray imaging in its basic steps. The method 200 comprises:

in a positioning step 210, also referred to as step a), positioning an X-ray detector relative to an X-ray source such that at least a part of a region between the X-ray source and the X-ray detector is an examination region for accommodating an object; in a controlling 220, also referred to as step b), controlling the X-ray source and the X-ray detector by a processing unit and:

in an operating step 230, also referred to as step c), operating in a first imaging operation mode; or in an operating step 240, also referred to as step d), operating in a second imaging operation mode; or in an operating step 250, also referred to as step e), operating in the first imaging mode and in the second imaging mode; or in an operating step 260, also referred to as step f), operating in a third imaging operation mode;

wherein, the detector comprises a first scintillator, a second scintillator, a first sensor array, and a second sensor array.

The first sensor array is associated with the first scintillator. The first sensor array comprises an array of sensor elements configured to detect optical photons generated in the first scintillator. The second sensor array is associated with the second scintillator. The second sensor array comprises an array of sensor elements configured to detect optical photons generated in the second scintillator. The first scintillator is disposed over the second scintillator such that X-rays emitted from the X-ray source first encounter the first scintillator and then encounter the second scintillator. The first scintillator has a thickness equal to or greater than 0.6 mm. The second scintillator has a thickness equal to or greater than 1.1 mm. In the first imaging operation mode the first scintillator and the first sensor array are configured to provide data useable to generate a low energy X-ray image. In the second imaging operation mode the second scintillator and the second sensor array are configured to provide data useable to generate a high energy X-ray image. In the third imaging operation mode the first scintillator, the first sensor array, the second scintillator and the second sensor array are configured to provide data useable to generate a combined energy X-ray image.

In an example, the thickness of the first scintillator is less than 1 mm. In an example, the first scintillator is a CsI scintillator. In an example, the first scintillator comprises a needle structure.

In an example, the second scintillator is a CsI scintillator. In an example, the second scintillator comprises a needle structure. In an example, the second scintillator is a Gadolinium Oxysulfide scintillator.

In an example, operation in the first imaging mode comprises a binning process to combine signals from a plurality of adjacent sensor elements of the first sensor array.

In an example, operation in the second imaging mode comprises a binning process to combine signals from a plurality of adjacent sensor elements of the second sensor array.

In an example, operation in the third imaging mode comprises a first binning process to combine signals from a plurality of adjacent sensor elements of the first sensor array and comprises a second binning process to combine signals from a plurality of adjacent sensor elements of the second sensor array.

In an example, a pixel size of the sensor elements of the first sensor array is the same as a pixel size of the sensor elements of the second sensor array.

In an example, a pixel size of the sensor elements of the first sensor array is smaller than a pixel size of the sensor elements of the second sensor array.

In an example, there is also provided a method for X-ray imaging that comprises:

in a positioning step, also referred to as step a), positioning an X-ray detector relative to an X-ray source such that at least a part of a region between the X-ray source and the X-ray detector is an examination region for accommodating an object;

in a controlling step, also referred to as step b), controlling the X-ray source and the X-ray detector by a processing unit and:

in an operating step, also referred to as step c), operating in a first imaging operation mode; or in an operating step, also referred to as step d), operating in a second imaging operation mode; or in an operating step, also referred to as step e), operating in the first imaging mode and in the second imaging mode; or in an operating step, also referred to as step f), operating in a third imaging operation mode;

wherein, the detector utilizes a GOS scintillator and comprises a first scintillator, a second scintillator, a first sensor array, and a second sensor array.

The first sensor array is associated with the first scintillator. The first sensor array comprises an array of sensor elements configured to detect optical photons generated in the first scintillator. The second sensor array is associated with the second scintillator. The second sensor array comprises an array of sensor elements configured to detect optical photons generated in the second scintillator. The first scintillator is disposed over the second scintillator such that X-rays emitted from the X-ray source first encounter the first scintillator and then encounter the second scintillator. The first scintillator has a thickness equal to or greater than 0.6 mm. The second scintillator has a thickness equal to or greater than 0.6 mm. The second scintillator is a Gadolinium Oxysulfide scintillator. In the first imaging operation mode the first scintillator and the first sensor array are configured to provide data useable to generate a low energy X-ray image. In the second imaging operation mode the second scintillator and the second sensor array are configured to provide data useable to generate a high energy X-ray image. In the third imaging operation mode the first scintillator, the first sensor array, the second scintillator and the second sensor array are configured to provide data useable to generate a combined energy X-ray image.

In an example, the second scintillator has a thickness equal to or greater than 0.8 mm. In an example, the second scintillator has a thickness equal to or greater than 1.0 mm. In an example, the second scintillator has a thickness equal to or greater than 1.2 mm. In an example, the second scintillator has a thickness equal to or greater than 1.3 mm.

In an example, the thickness of the first scintillator is less than 1 mm. In an example, the first scintillator is a CsI scintillator. In an example, the first scintillator comprises a needle structure.

In an example, operation in the first imaging mode comprises a binning process to combine signals from a plurality of adjacent sensor elements of the first sensor array.

In an example, operation in the second imaging mode comprises a binning process to combine signals from a plurality of adjacent sensor elements of the second sensor array.

In an example, operation in the third imaging mode comprises a first binning process to combine signals from a plurality of adjacent sensor elements of the first sensor array and comprises a second binning process to combine signals from a plurality of adjacent sensor elements of the second sensor array.

In an example, a pixel size of the sensor elements of the first sensor array is the same as a pixel size of the sensor elements of the second sensor array.

In an example, a pixel size of the sensor elements of the first sensor array is smaller than a pixel size of the sensor elements of the second sensor array.

Figure 4:
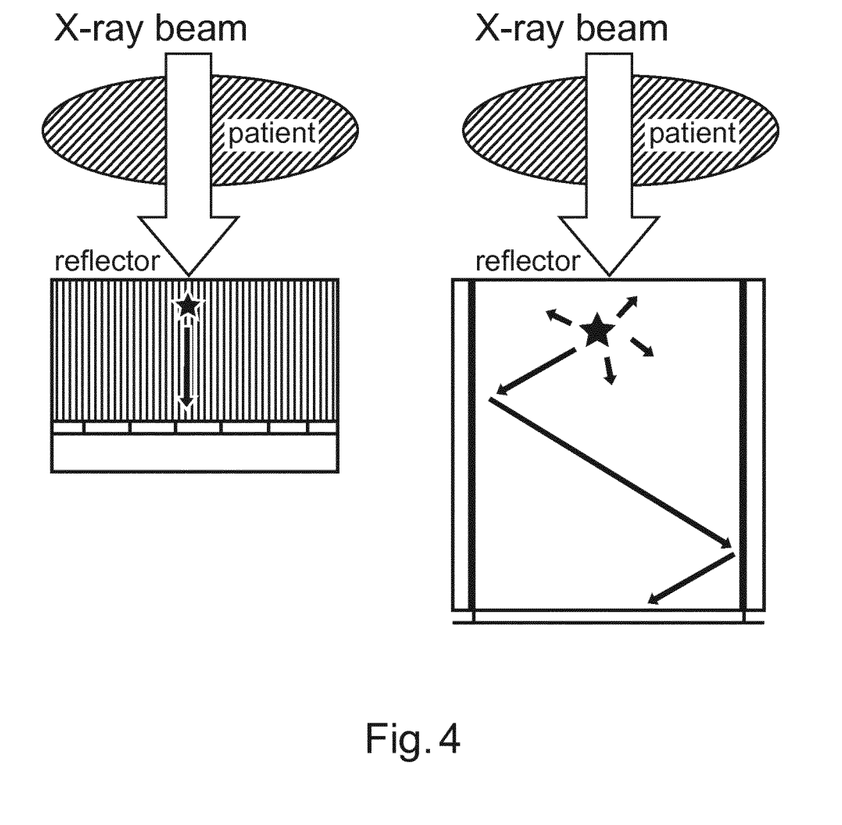
FIG. 4 shows examples of conventional detectors for 2D and 3D imaging.

FIG. 4 shows conventional 2D and 3D detectors for X-ray imaging. The left hand image of FIG. 4 depicts a conventional X-ray detector, designed for optimal 2D image guidance in the interventional suite. The high spatial resolution is achieved by a small pixel size (e.g. 150 µm) and by limiting the spread of the visible light generated by the scintillator. For example, a CsI scintillator has a limited thickness (<800 µm) and the CsI has a needle structure that enables optical waveguiding down to the optical image sensor. Thus such a detector is for optimal treatment and for optimal spatial resolution. The right hand image of FIG. 4 shows a conventional CT detector, as used for 3D imaging, that has a much larger pixel size of up to 1 mm and is optimized for high X-ray absorption (about 1.5 mm thick pixelated scintillator), so that, together with minimized scatter, high contrast images are achieved for diagnosis. Thus such a detector is for optimal diagnosis and optimal X-ray absorption.

Figure 5:
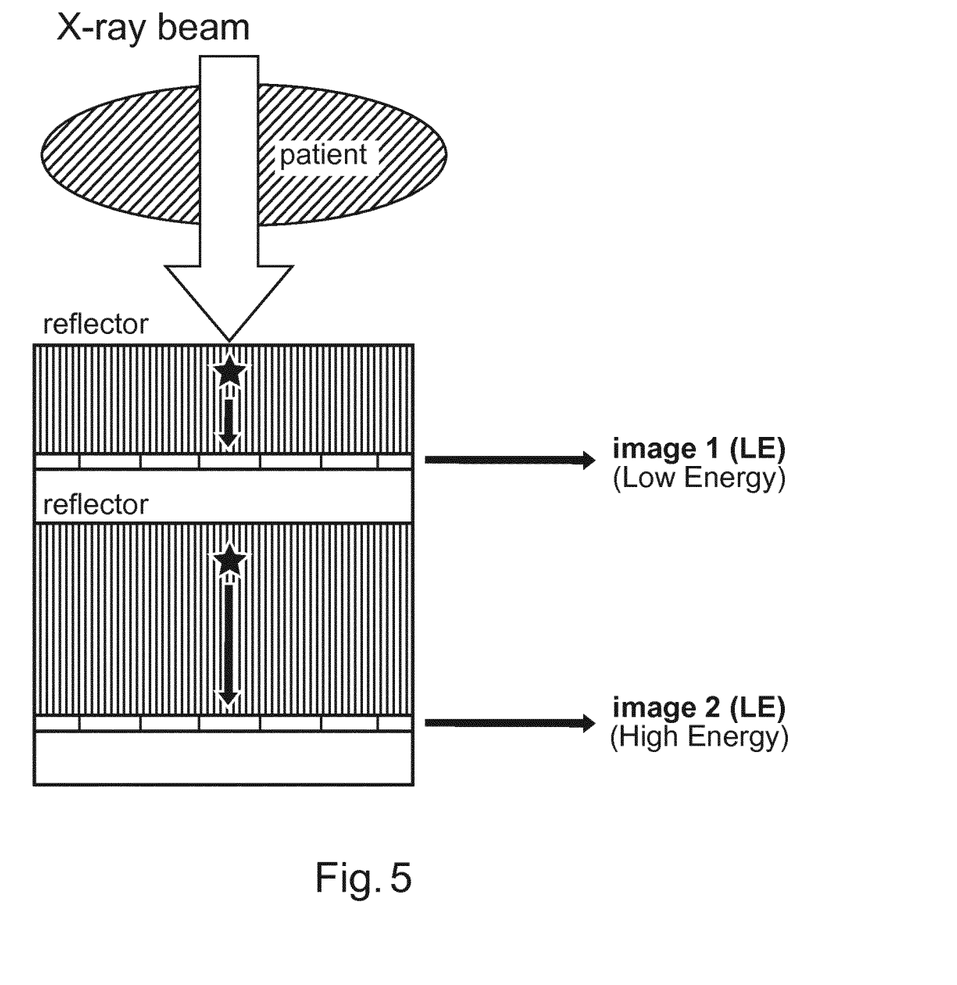
FIG. 5 shows a detailed example of a detector for X-ray imaging as described with respect to FIG. 1.
Figure 6:
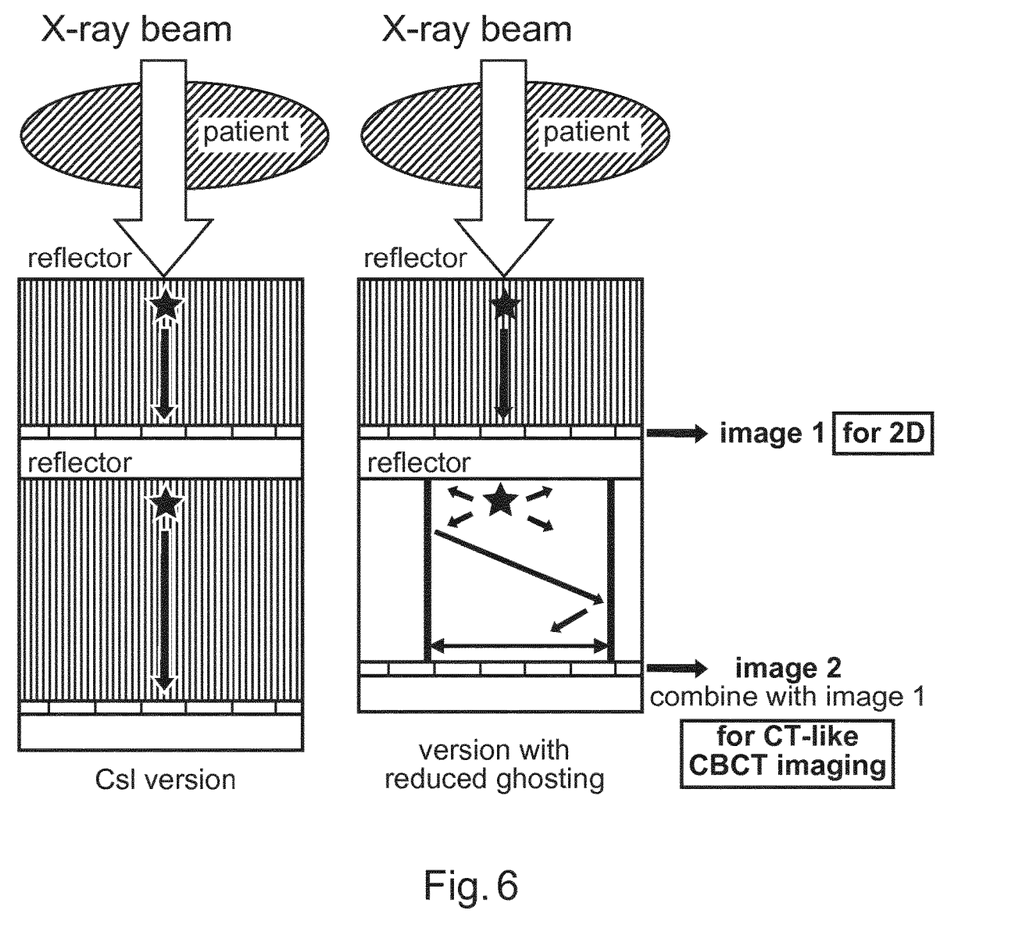
FIG. 6 shows detailed examples of detectors for X-ray imaging as described with respect to FIG. 1.
Figure 7:
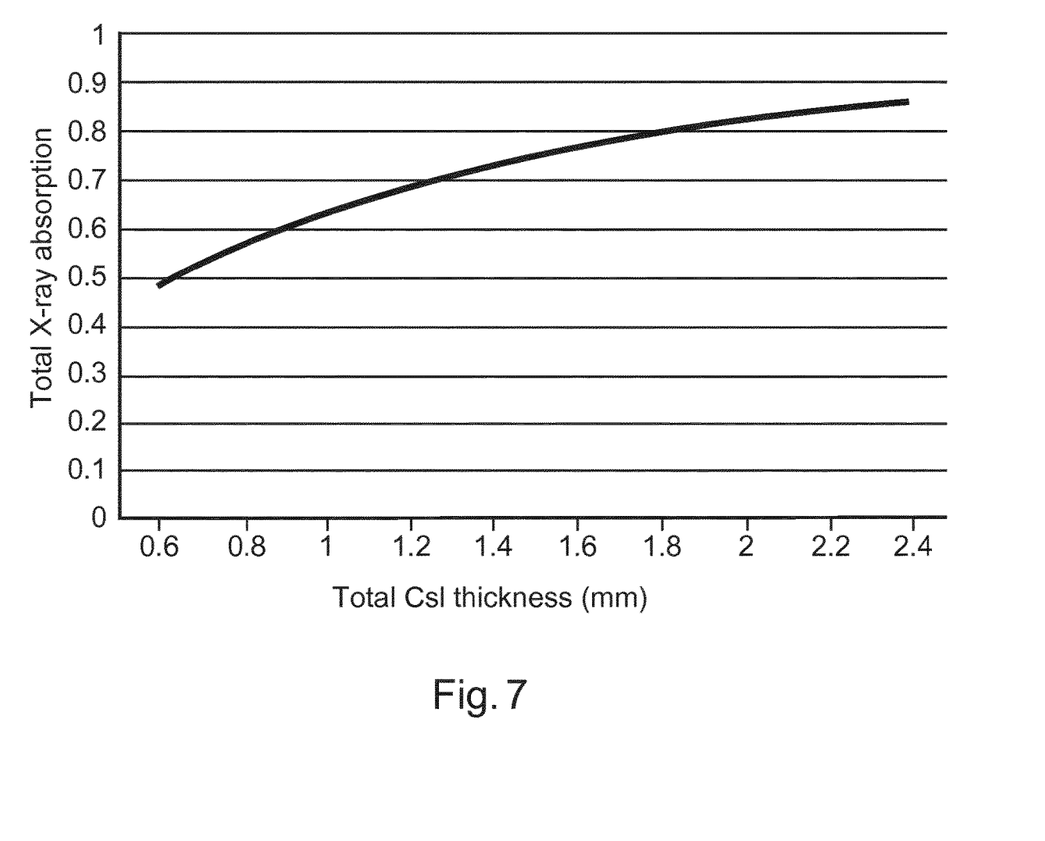
FIG. 7 shows the total X-ray absorption of a detector as described with respect to FIG. 1 that has two CsI scintillators as a function of total CsI thickness at 140 kV.

The detector, system and method for X-ray imaging as described with respect to FIGS. 1-3 is now described in more detail with respect to FIGS. 5-7.

FIG. 5 shows a detailed example of a detector for X-ray imaging. The detector is a dual layer X-ray detector, that provides for optimal spatial resolution and enhanced X-ray absorption. A first layer has a reflector, followed by a scintillator below which is an optical radiation detector array. The scintillator is made of CsI and has a needle structure that wave-guides the radiation down to the detection array. Low energy X-rays are absorbed in the scintillator and read out of the detector array enables image acquisition and display. The first layer is kept very thin in order that high resolution X-ray imaging is enabled. A second layer is positioned below the first layer. The second layer has a reflector, followed by a second scintillator below which is a second optical radiation detector array. The second scintillator is made of CsI, also has a needle structure that wave-guides the radiation down to the detection array. Higher energy X-rays are absorbed in the second scintillator than were absorbed in the first scintillator and read out of the detector array enables image acquisition and display. The second layer is thick enough such that increased X-ray absorption is achieved. The read-out from the first detector array and from the second detector array is combined, to provide a combined image that extends over both the low and high energy bands. This image has a reduced spatial resolution to that achieved from operation of just the first layer because the second scintillator is thicker than the first scintillator, but provides high contrast imagery commensurate with utilization in 3D imagery. If necessary, the read-out from the first detector array can be binned in order to match the spatial resolution being returned from the second layer. This also speeds up read-out. The read-out from the second detector array can also be binned to speed up read-out. The binning process combines the signal from one or more neighboring pixels. Additionally, as the read-out from the first layer relates to low energy X-rays and the read-out from the high energy X-rays relates to high energy X-rays, the two read-outs can be used as part of a dual energy detection system. The first scintillator can have an associated sensor array having pixel sizes that intrinsically match the resolution for that thickness, where binning is then used to speed up operation. The first scintillator can have an increased thickness, and operate with a standard (and therefore cost effective) sensor array having pixels sizes that are smaller than the intrinsic resolution at that thickness. A binning process can then be used to combine the signal from neighboring pixels, without reducing the resolution, but leading to an increase in read-out speed. Similarly, the second scintillator can have an associated sensor array that has pixel sizes that match the intrinsic resolution, with binning then being used to improve speed. However, a standard sensor array can be used, that could be the same as that used for the first scintillator, and signal could be spread over more than one pixel, with again binning leading to no loss of resolution but an increase in speed. The binning process can also be used for the first scintillator to match the resolution returned from the second scintillator whether operating in a binning mode or not. The scintillator thicknesses can be such that the X-ray dose is distributed evenly between the Low Energy and High Energy image data.

FIG. 6 shows two detailed versions of detector as detectors as described with respect to FIG. 1. In the left hand picture is a detector as described with respect to FIG. 5, whilst in the right hand picture a fast CT-like material (e.g. GOS) has been used for the bottom scintillator, providing for a detector that also has exceptionally low ghosting in interventional X-ray imaging applications. Thus, the detectors are Hybrid X-ray detectors, that provide for optimal treatment and optimal diagnosis, provide for optimal spatial resolution for 2D, and provide for enhanced X-ray absorption for 3D.

However, for both versions, for high resolution 2D imaging, a detector is provided with a top scintillator of an appropriate thickness, and the image from this detector can be used alone (image 1) for all 2D applications. This top scintillator can be as thick as in the conventional X-ray detector. This top scintillator of the detector can also be used for non-binned 3D applications, where optimal image quality can be assured for image guidance (and high resolution 3D applications). However, using a combination of image 1 and image 2, a combined image can be generated for 3D imaging (where binning can be applied). To achieve this, the bottom scintillator can be made thicker than the top scintillator. The resulting total X-ray absorption, mainly for high kVp settings (e.g. 120 or 140 kVp), that can be realized is exceptionally high for an X-ray detector, reaching CT-like imaging, with FIG. 7 providing details relating to total X-ray absorption as a function of total scintillator thickness for both scintillators when made from CsI and for operation at 140 kV, and with 0.4 mm Cu, 300 mm $H_2O$, 75% CsI packing density. The bottom scintillator in the right hand picture shows an example of 4×4 binning for 3D.

Advanced image processing can be applied to image 1 and image 2. In this way, super-resolution can be achieved, so that image 2 (better contrast) could be used to improve image 1 (better spatial resolution) or vice versa. In this case image 2 can be used for 2D applications. Also, scatter correction can be improved, by exploiting the fact that two images are acquired with different scatter information. Also, as discussed because image 1 and image 2 relate to the acquisition of different energy X-rays, the detector also provided for dual energy image acquisition.

Binning of Pixels

Binning of pixels refers to the summing or averaging signals from a number of adjacent pixels. Such binning is often done over rectangular or square arrangement of pixels, but is not limited to those shapes. The binning process can take place:

by directly connecting pixels with each other using dedicated binning switches, by (simultaneous) readout of adjacent rows, where signals are summed on the readout columns ("vertical binning"), by cross connecting readout columns during readout, thus summing or averaging signals of adjacent columns ("horizontal binning"), by summing or averaging signals from adjacent readout columns in the readout ASICs at the edge of a detector panel ("horizontal binning"), by summing or averaging of signals in the digital domain after reading out individual (or one-dimensionally binned) pixels, or a combination of the preceding processes.

In another exemplary embodiment, a computer program or computer program element is provided that is characterized by being configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A detector for X-ray imaging, comprising:
   a first scintillator;
   a second scintillator;
   a first sensor array; and
   a second sensor array;
   wherein the first sensor array is associated with the first scintillator, the first sensor array comprising an array of sensor elements configured to detect optical photons generated in the first scintillator;
   wherein the second sensor array is associated with the second scintillator, the second sensor array comprising an array of sensor elements configured to detect optical photons generated in the second scintillator;
   wherein the first scintillator is disposed over the second scintillator such that X-rays emitted from an X-ray source encounter the first scintillator and then encounter the second scintillator;
   wherein the first scintillator has a thickness equal to or greater than approximately 0.6 mm;
   wherein the second scintillator has a thickness equal to or greater than approximately 1.1 mm;

wherein in a first imaging operation mode the first scintillator and the first sensor array are configured to provide data useable to generate a low energy X-ray image;

wherein in a second imaging operation mode the second scintillator and the second sensor array are configured to provide data useable to generate a high energy X-ray image, an operation in the second imaging mode comprising a binning process to combine signals from a plurality of adjacent sensor elements of the second sensor array; and wherein in a third imaging operation mode the first scintillator, the first sensor array, the second scintillator and the second sensor array are configured to provide data useable to generate a combined energy X-ray image.

2. The detector according to claim 1, wherein the first scintillator is a CsI scintillator.

3. The detector according to claim 1, wherein the first scintillator comprises a needle structure.

4. The detector according to claim 1, wherein the second scintillator is a CsI scintillator.

5. The detector according to claim 1, wherein the second scintillator comprises a needle structure.

6. The detector according to claim 1, wherein the second scintillator is a Gadolinium Oxysulfide scintillator.

7. The detector according to claim 1, wherein an operation in the first imaging mode comprises a binning process to combine signals from a plurality of adjacent sensor elements of the first sensor array.

8. The detector according to claim 1, wherein an operation in the third imaging mode comprises a first binning process to combine signals from a plurality of adjacent sensor elements of the first sensor array and comprises a second binning process to combine signals from a plurality of adjacent sensor elements of the second sensor array.

9. The detector according to claim 1, wherein a pixel size of the sensor elements of the first sensor array is substantially equal to a pixel size of the sensor elements of the second sensor array.

10. The detector according to claim 1, wherein a pixel size of the sensor elements of the first sensor array is smaller than a pixel size of the sensor elements of the second sensor array.

11. An X-ray imaging system, comprising:
an X-ray source;
an X-ray detector according to claim 1; and
a processing unit;
wherein the X-ray detector is positioned relative to the X-ray source such that at least a part of a region between the X-ray source and the X-ray detector is an examination region for accommodating an object;

wherein the processing unit is configured to control the X-ray source and the X-ray detector to:
operate in the first imaging operation mode;
operate in the second imaging operation mode; and
operate in the third imaging operation mode.

12. A method for X-ray imaging, comprising:
positioning an X-ray detector relative to an X-ray source such that at least a part of a region between the X-ray source and the X-ray detector is an examination region for accommodating an object;

controlling the X-ray detector and the X-ray source by a processing unit wherein the X-ray detector comprises:
a first scintillator;
a second scintillator;
a first sensor array; and
a second sensor array; and wherein the first sensor array is associated with the first scintillator, the first sensor array comprising an array of sensor elements configured to detect optical photons generated in the first scintillator;

wherein the second sensor array is associated with the second scintillator, the second sensor array comprising an array of sensor elements configured to detect optical photons generated in the second scintillator;

wherein the first scintillator is disposed over the second scintillator such that X-rays emitted from an X-ray source encounter the first scintillator and then encounter the second scintillator;

wherein the first scintillator has a thickness equal to or greater than approximately 0.6 mm;

wherein the second scintillator has a thickness equal to or greater than approximately 1.1 mm;

wherein in a first imaging operation mode the first scintillator and the first sensor array are configured to provide data useable to generate a low energy X-ray image;

wherein in a second imaging operation mode the second scintillator and the second sensor array are configured to provide data useable to generate a high energy X-ray image; and wherein in a third imaging operation mode the first scintillator, the first sensor array, the second scintillator and the second sensor array are configured to provide data useable to generate a combined energy X-ray image.

* * * * *